US009210543B2

(12) United States Patent
Shin et al.

(10) Patent No.: US 9,210,543 B2
(45) Date of Patent: Dec. 8, 2015

(54) APPARATUS FOR DETERMINING INDOOR LOCATION AND METHOD FOR DETERMINING INDOOR LOCATION IN MULTI-STORY BUILDING USING THE SAME

(71) Applicant: SOONGSIL UNIVERSITY RESEARCH CONSORTIUM TECHNO-PARK, Seoul (KR)

(72) Inventors: Yo An Shin, Seoul (KR); Jian Shi, Seoul (KR); Kwang Yul Kim, Seoul (KR); Xiang Li, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 18 days.

(21) Appl. No.: 14/287,200

(22) Filed: May 27, 2014

(65) Prior Publication Data

US 2015/0133150 A1    May 14, 2015

(30) Foreign Application Priority Data

Nov. 8, 2013    (KR) .......................... 10-2013-0135718

(51) Int. Cl.
    *H04W 4/02*    (2009.01)
(52) U.S. Cl.
    CPC ...................................... *H04W 4/02* (2013.01)

(58) Field of Classification Search
    CPC ....... H04W 64/00; H04W 16/20; H04W 4/02; G01C 21/206
    USPC ................................................ 455/456.1–457
    See application file for complete search history.

(56) References Cited

U.S. PATENT DOCUMENTS

| | | | |
|---|---|---|---|
| 2009/0067392 A1* | 3/2009 | Hart | ......................... G01S 5/02 370/338 |
| 2014/0032161 A1* | 1/2014 | Das | ....................... G01C 21/00 702/138 |

FOREIGN PATENT DOCUMENTS

KR    10-2012-0069267 A    6/2012

* cited by examiner

*Primary Examiner* — Michael Mapa
(74) *Attorney, Agent, or Firm* — Revolution IP, PLLC

(57) ABSTRACT

Disclosed is a method for determining an indoor location which includes receiving signals including IDs and information on floors from a plurality of APs that is provided at floors of the multi-story building; measuring reception signal strengths of the received signals, and selecting candidate floors by using the measured reception signal strengths; predicting reception signal strengths of the other candidate floors by using the reception signal strengths of the APs provided at the respective candidate floors; and calculating variance values for the reception signal strengths of the candidate floors, and estimating a current location by using the variance values.

8 Claims, 4 Drawing Sheets

$\mathbb{R} = \{R_1, R_2, \cdots, R_i\}$

APPARATUS FOR DETERMINING INDOOR LOCATION AND METHOD FOR DETERMINING INDOOR LOCATION IN MULTI-STORY BUILDING USING THE SAME

CROSS-REFERENCE TO RELATED APPLICATIONS

This application claims the priority of Korean Patent Application No. 10-2013-0135718 filed on Nov. 8, 2013, in the Korean Intellectual Property Office, the disclosure of which is incorporated herein by reference.

BACKGROUND OF THE INVENTION

1. Field of the Invention

The present invention relates to wireless localization in a multi-story environment, and more particularly, to an apparatus for determining an indoor location and a method for determining an indoor location in a multi-story building.

2. Description of the Related Art

In recent years, urbanization has been rapidly progressed in each country, and many high-rise buildings have been constructed in a center of town. For this reason, when locational information of a target is needed in a three-dimensional multi-story building, locational information of simple two-dimensional plane coordinates is not useful for estimating a precise location of the target. Thus, an overriding problem to be solved for wireless localization in the multi-story building is to accurately determine a floor of the building at which a user is positioned. Particularly, in order to provide various application services for indoor localization, there is an increasing need for floor information, and a technology for determining an inter-floor location has been increasingly noticed due to the need for indoor localization.

Indoor wireless localization depends on a GPS (Global Positioning System) having an accuracy of 1 m to 10 m. The GPS is developed for military purpose, but has widely used for civilian purpose such as weapon guiding, navigation, measurement, cartography, land surveying, and visual synchronization in addition to the military purpose. In this way, the GPS exhibits an optimal localization performance in an outdoor environment, but is not used in an indoor environment due to signal attenuation and dispersion. That is, it is necessary to apply requirements different from an outdoor localization system to an indoor localization system. Many technologies for indoor localization have been suggested over the last ten years. Among these technologies, a technology using Wi-Fi that has been already commercialized and is relatively low-cost has been researched. A Wi-Fi hotspot is widely used in buildings of town, and since most terminals such as a smartphone, a tablet PC, and a laptop computer have a Wi-Fi available function, it is possible to perform inter-floor localization using a Wi-Fi signal.

Further, various algorithms that perform wireless localization such TOA (Time of Arrival), AOA (Angle of Arrival), and RSS (Received Signal Strength) by using a Wi-Fi signal as in a technology for GPS-based outdoor wireless localization have been proposed. Particularly, since the AOA and TOA techniques need to measure an angle and perform time synchronization, additional devices are required. However, since the RSS technique needs to simply measure magnitude of a signal, it is possible to provide locational information at low implementing cost.

The related art of the present invention is described in Korean Patent Publication No. 2012-0069267 (Jun. 28, 2012).

SUMMARY OF THE INVENTION

An aspect of the present invention provides an apparatus for determining an indoor location and a method for determining an indoor location in a multi-story building with which it is possible to reduce implementing cost and technical complexity in determining a RSSI-based inter-floor location by using a Wi-Fi signal.

Further, an aspect of the present invention also provides an apparatus for determining a RSS-based inter-floor indoor location and a method for determining an indoor location by using the apparatus with which it is possible to achieve high accuracy and safety in a radio environment as compared to an existing technology.

According to an aspect of the present invention, there is provided a method for determining an indoor location in a multi-story building by using an apparatus for determining an indoor location. The method includes receiving signals including IDs and information on floors from a plurality of APs that is provided at floors of the multi-story building; measuring reception signal strengths of the received signals, and selecting candidate floors by using the measured reception signal strengths; predicting reception signal strengths of the other candidate floors by using the reception signal strengths of the APs provided at the respective candidate floors; and calculating variance values for the reception signal strengths of the candidate floors, and estimating a current location by using the variance values.

In the receiving signals, the signals including the ID and the information on floors may be received from the plurality of APs by using Wi-Fi signals.

In the predicting reception signal strengths, the reception signal strengths of the other candidate floors may be predicted in consideration of an inter-floor signal loss value with the other candidate floors by using the measured reception signal strengths of the respective candidate floors.

In the predicting reception signal strengths, the reception signal strengths of the other candidate floors may be predicted using the following equation:

$$RSSI_P = RSSI_i - Lf * |FloorIDi - P|$$

where $RSSI_P$ is a predicted reception signal strength of a P floor which is one of the other candidate floors, $RSSI_i$ is a reception signal strength of an AP signal corresponding to the measured i floor, Lf is an inter-floor signal loss index, FloorIDi is the floors at which the APs corresponding to the received signals are provided, and P is the candidate floors.

In the estimating a current location, it may be estimated that the floor having the smallest variance value is a current location of the apparatus for determining an indoor location.

According to another aspect of the present invention, there is provided an apparatus for determining an indoor location, which determines a current location in a multi-story building. The apparatus includes a signal receiving unit that receives signals including IDs and information on floors from a plurality of APs provided at floors of the multi-story building; a reception signal strength measuring unit that measures reception signal strengths of the received signals, and selects candidate floors by using the measured reception signal strengths; a reception signal strength predicting unit that predicts reception signal strengths of the other candidate floors by using the reception signal strengths of the APs provided at the candidate floors; and a location estimating unit that calculates variance values for the reception signal strengths of the candidate floors, and estimates the current location by using the variance values.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
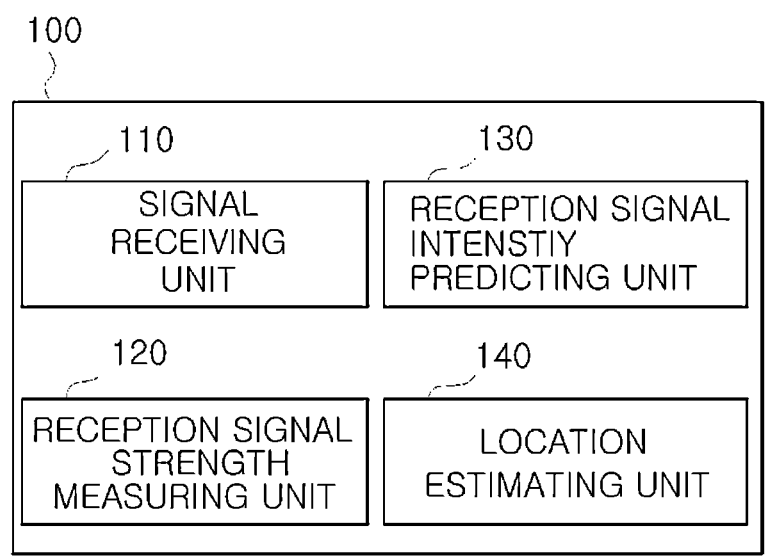
FIG. 1 is a configuration diagram for an apparatus for determining an indoor location in a multi-story building according to an exemplary embodiment of the present invention.

Exemplary embodiments of the present invention will now be described in detail with reference to the accompanying drawings.

As set forth above, according to exemplary embodiments of the invention, it is possible to reduce implementing cost and technical complexity in determining a RSSI-based inter-floor location by using a Wi-Fi signal.

Further, it is possible to implement an apparatus for determining a RSSI-based inter-floor location and a method for determining an indoor location by using the apparatus with which it is possible to achieve high accuracy and safety as compared to an existing technology.

Exemplary embodiments of the present invention will now be described in detail with reference to the accompanying drawings so as to allow those having ordinary skill in the art to easily implement the embodiments. However, the present invention may be implemented in various manners, but is not limited to the disclosed embodiments. Further, in the drawings, components that do not related to the description will not be illustrated to clearly describe the present invention, and throughout the specification, like parts will be assigned like reference numerals.

FIG. 1 is a configuration diagram of an apparatus for determining an indoor location in a multi-story building according to an exemplary embodiment of the present invention.

As illustrated in FIG. 1, an apparatus for determining an indoor location in a multi-story building 100 according to an exemplary embodiment of the present invention includes a signal receiving unit 110, a reception signal strength measuring unit 120, a reception signal strength predicting unit 130, and a location estimating unit 140. In the present invention, the apparatus for determining an indoor location 100 may be implemented as a communication terminal such as one independent terminal, a smartphone or a table PC that can perform various types of radio communications.

Figure 2:
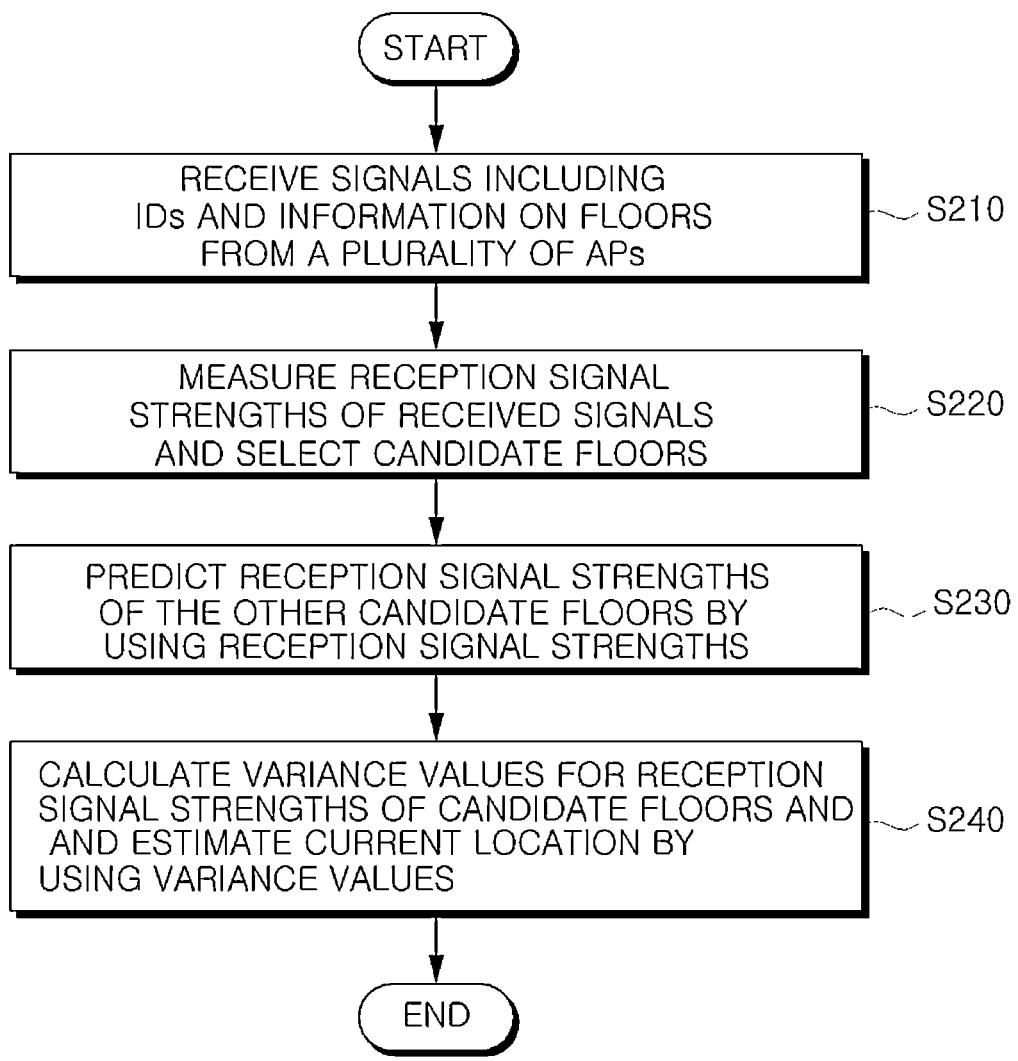
FIG. 2 is a flowchart for describing a method for determining an indoor location in a multi-story building according to an exemplary embodiment of the present invention.

FIG. 2 is a flowchart for describing a method for determining an indoor location in a multi-story building according to an exemplary embodiment of the present invention.

In FIG. 2, the signal receiving unit 110 receives a signal including IDs and information on floors from a plurality of APs that is provided at floors of the multi-story building (S210).

The AP (Access Point) is a device that connects a wired LAN and a wireless LAN, and functions to connect a radio terminal equipped with a wireless LAN card to a network. The AP is mostly an independent device, and can be inserted into an Ethernet hub or a server to be used. In the exemplary embodiment of the present invention, the AP is may be particularly implemented as an internet wired/wireless sharer that is provided in a PC.

At least one or more APs are provided at each floor, and a plurality of APs may be provided at each floor. The plurality of APs that is provided at each floor has a unique ID, respectively, and transmits a radio signal to allow the radio terminal to access. The radio signal includes the ID and the information on the floor at which the AP is provided.

In particular, the signal receiving unit 110 receives the signals including the IDs and the information on floors from the plurality of APs by using Wi-Fi signals.

Subsequently, the reception signal strength measuring unit 120 measures reception signal strengths of the signals received by the signal receiving unit 110, and selects candidate floors by using the measured reception signal strengths (S220). Since the signal received from each floor includes the unique ID and the information on the floor at which the AP is provided, the signal receiving unit 110 can select the reception signal and the floor.

In FIG. 2, the reception signal strength predicting unit 130 predicts reception signal strengths of other candidate floors by using the reception signal strengths of the APs provided at the respective candidate floors (S230).

Particularly, the reception signal strength predicting unit 130 predicts the reception signal strengths of the other candidate floors in consideration of a signal loss value with the other candidate floors by using the measured reception signal strengths of the candidate floors.

In particular, the reception signal strength predicting unit 130 predicts the reception signal strengths of the other candidate floors by using Equation 1.

$$RSSI_P = RSSI_i - Lf * |FloorIDi - P| \qquad \text{[Equation 1]}$$

where $RSSI_P$ is a predicted reception signal strength of a P floor which is one of the other candidate floors, $RSSI_i$ is a reception signal strength of an AP signal corresponding to the measured i floor, Lf is an inter-floor signal loss index, FloorIDi is the floors at which the APs corresponding to the received signals are provided, and P is the candidate floors.

Finally, the location estimating unit 140 calculates variance values for the reception signal strengths of the candidate floors, and estimates a current location by using the variance values (S240).

Particularly, the location estimating unit 140 estimates that the floor having the smallest variance value is the current location of the apparatus for determining an indoor location.

Next, the method for determining an indoor location in a multi-story building according to the exemplary embodiment of the present invention will be described in detail with reference to FIGS. 3 and 4.

Figure 3:
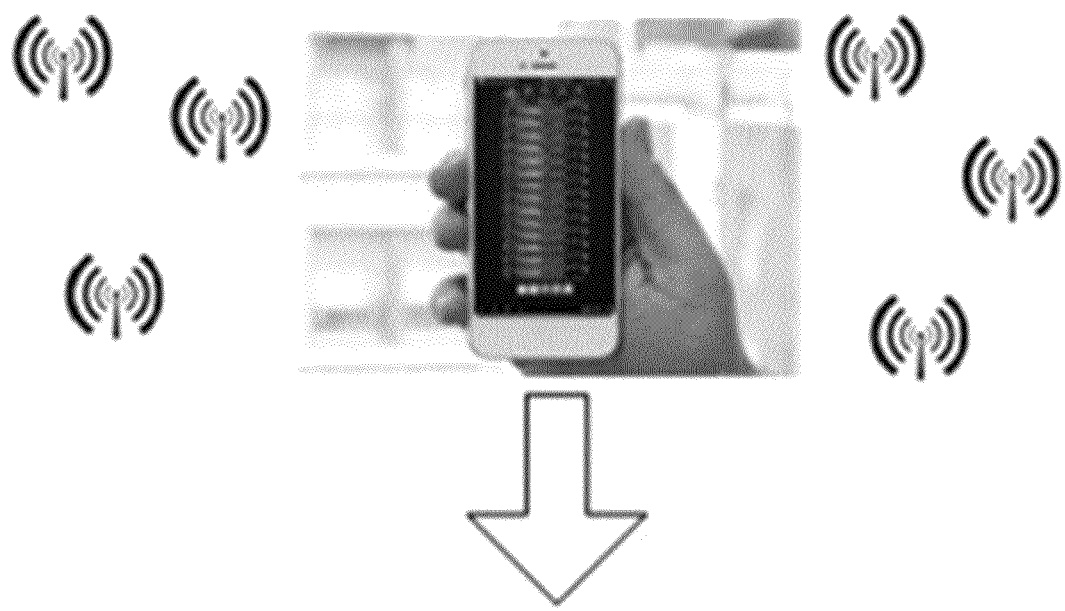
FIG. 3 is a diagram for describing step S210 of FIG. 2.

FIG. 3 is a diagram for describing step S210 of FIG. 2.

In FIG. 3, $R = \{R_1, R_2, \ldots, R_i\}$ is a set indicating Wi-Fi signals from the floors received by the signal receiving unit 110. Here, the apparatus for determining an indoor location 100 receives the signals including the IDs and the information on floors from the plurality of APs by using the Wi-Fi signals in the i-story building.

Figure 4:
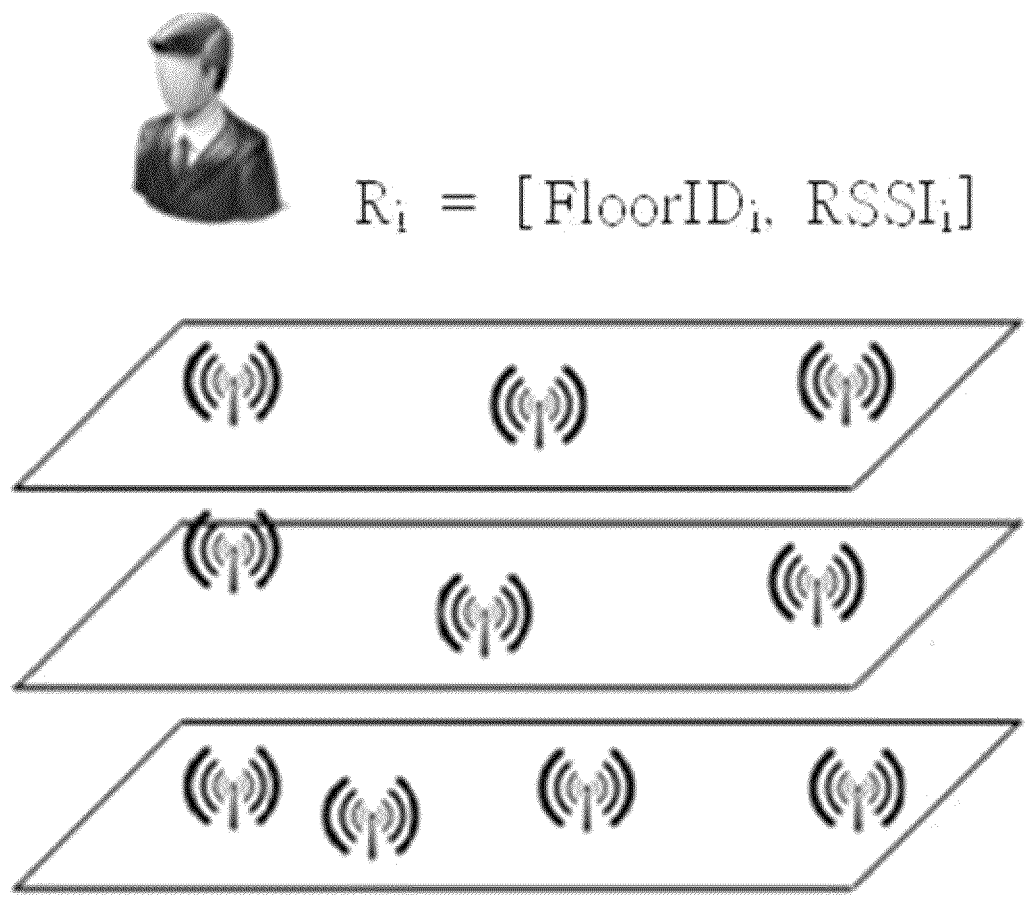
FIG. 4 is a diagram for describing step S220 of FIG. 2.

FIG. 4 is a diagram for describing step S220 of FIG. 2.

In FIG. 4, Ri=[FloorIDi, RSSIi] indicates the reception signal strengths and the information on floors for the Wi-Fi signals transmitted from the floors.

Here, a dB is used as an unit of the reception signal strength, and for the sake of convenience in description, it is assumed that signals of $R_3=\{3, 15\}$, $R_4=\{4, 16\}$ and $R_5=\{5, 14\}$ are received.

That is, it is assumed that a reception signal strength of the signal received from the AP provided at the third floor is 15 dB, a reception signal strength of the signal received from the AP provided at the fourth floor is 16 dB, and a reception signal strength of the signal received from the AP provided at the fifth floor is 14 dB.

In this example, since the signals are received from only the APs provided at the third, fourth and fifth floors among the APs provided at all floors, the reception signal strength measuring unit 120 selects the third, fourth and fifth floors as candidate floors among all the floors, and excludes the other floors from the candidate floors. Here, the reception signal strength measuring unit 120 selects floors having reception signal strengths equal to or more than a reference value as the candidate floors, and the reference value may be determined in consideration of a communication environment or the number of floors of a building.

As described above, when the third, fourth and fifth floors are determined as the candidate floors, the reception signal strength predicting unit 130 predicts reception signal strengths of the other candidate floors by using Equation 1, and results represented in Table 1 can be obtained. In Table 1, it is assumed that an inter-floor signal loss index Lf is 1 dB.

TABLE 1

|  | FloorID$_3$ | FloorID$_4$ | FloorID$_5$ |
|---|---|---|---|
| Third floor | 15 dB (measurement value) | 15 dB (prediction value) | 12 dB (prediction value) |
| Fourth floor | 14 dB (prediction value) | 16 dB (measurement value) | 13 dB (prediction value) |
| Fifth floor | 13 dB (prediction value) | 15 dB (prediction value) | 14 dB (measurement value) |

As seen from Table 1, when the reception signal strength measured from the AP(FloorID$_3$) provided at the third floor is 15 dB, the reception signal strength predicting unit 130 can predict reception signal strengths of the fourth and fifth floors which are the other candidate floors. That is, reception signal strength predicting unit 130 predicts that a reception signal strength when the AP(FloorID$_3$) is provided at the fourth floor is 14 dB by using Equation 1, and predicts that a reception signal strength when the AP(FloorID$_3$) is provided at the fifth floor is 13 dB by using Equation 1.

Furthermore, when the reception signal strength measured from the AP(FloorID$_4$) provided at the fourth floor is 16 dB, the reception signal strength predicting unit 130 can predict reception signal strengths at the third and fifth floors which are the other candidate floors. That is, the reception signal strength predicting unit 130 predicts that a reception signal strength when the AP(FloorID$_4$) is provided at the third floor is 15 dB by using Equation 1, and predicts that a reception signal strength when the AP(FloorID$_4$) is provided at the fifth floor is 15 dB by using Equation 1.

When the reception signal strength measured from the AP(FloorID$_5$) provided at the fifth floor is 14 dB, the reception signal strength predicting unit 130 can predict reception signal strengths at the third and fourth floors which are the other candidate floors. That is, the reception signal strength predicting unit 130 predicts that a reception signal strength when the AP(FloorID$_5$) is provided at the third floor is 12 dB by using Equation 1, and predicts that a reception signal strength when the AP(FloorID$_5$) is provided at the fourth floor is 13 dB by using Equation 1.

As stated above, the reception signal strengths measured at the APs of the respective floors and the predicted reception signal strengths can be represented as $F_3=\{15, 15, 12\}$, $F_4=\{14, 16, 13\}$ and $F_5=\{13, 15, 14\}$.

Thereafter, the location estimating unit 140 calculates the variance values for the respective floors by using the reception signal strengths obtained from the example described above as data.

From the calculated results, it can be seen that a variance value Var($F_3$) of a reception signal strength $F_3$ corresponding to the third floor is 6, a variance value Var($F_4$) of a reception signal strength $F_4$ corresponding to the fourth floor is 4.6667, and a variance value Var($F_5$) of a reception signal strength $F_5$ corresponding to the fifth floor is 5.

Accordingly, since the floor having the smallest variance value of the variance values is the fourth floor, the location estimating unit 140 estimates that the current location of the apparatus for determining an indoor location 100 is the fourth floor.

In accordance with the apparatus for determining an indoor location in a multi-story building and the method for determining an indoor location by using the apparatus according to the exemplary embodiment of the present invention, it is possible to reduce implementing cost and technical complexity in determining a RSS-based inter-floor location using the Wi-Fi signals.

Moreover, it is possible to implement an apparatus for determining a RSS-based inter-floor indoor location and a method for determining an indoor location by using the apparatus with which it is possible to achieve high accuracy and safety as compared to an existing technology.

The present invention has been described in conjunction with the exemplary embodiments. It should be understood by those skilled in the art that modifications can be implemented without departing from an essential feature of the present invention. Accordingly, it is considered that the disclosed exemplary embodiments are illustrative but are not restrictive. Therefore, the scope of the present invention is not limited to the embodiments, and the appended claims and their equivalents are intended to cover various embodiments as would fall within the scope of the present invention.

While the present invention has been illustrated and described in connection with the exemplary embodiments, it will be apparent to those skilled in the art that modifications and variations can be made without departing from the spirit and scope of the invention as defined by the appended claims.

What is claimed is:

1. A method for determining an indoor location in a multi-story building by using an apparatus for determining an indoor location, the method comprising:
   receiving signals including IDs and information on floors from a plurality of APs that is provided at floors of the multi-story building;
   measuring reception signal strengths of the received signals, and selecting candidate floors by using the measured reception signal strengths;
   predicting reception signal strengths of the other candidate floors by using the reception signal strengths of the APs provided at the respective candidate floors, wherein the reception signal strengths of the other candidate floors are predicted using the following equation, $$RSSI_P = RSSI_i - Lf * |FloorID i - P|,$$

where $RSSI_P$ is a predicted reception signal strength of a P floor which is one of the other candidate floors, $RSSI_i$ is a reception signal strength of an AP signal corresponding to the measured i floor, Lf is an inter-floor signal loss index, FloorIDi is the floors at which the APs corresponding to the received signals are provided, and P is the candidate floors; and calculating variance values for the reception signal strengths of the candidate floors, and estimating a current location by using the variance values.

2. The method of claim 1, wherein in the receiving signals, the signals including the ID and the information on floors are received from the plurality of APs by using Wi-Fi signals.

3. The method of claim 2, wherein in the predicting reception signal strengths, the reception signal strengths of the other candidate floors are predicted in consideration of an inter-floor signal loss value with the other candidate floors by using the measured reception signal strengths of the respective candidate floors.

4. The method of claim 1, wherein in the estimating a current location, the floor having the smallest variance value is estimated as a current location of the apparatus for determining an indoor location.

5. An apparatus for determining an indoor location, which determines a current location in a multi-story building, the apparatus comprising a non-transitory computer-readable storage device, wherein a plurality of units are implemented in the storage device, the units comprising:

a signal receiving unit that receives signals including IDs and information on floors from a plurality of APs provided at floors of the multi-story building;

a reception signal strength measuring unit that measures reception signal strengths of the received signals, and selects candidate floors by using the measured reception signal strengths;

a reception signal strength predicting unit that predicts reception signal strengths of the other candidate floors by using the reception signal strengths of the APs provided at the candidate floors, wherein the reception signal strength predicting unit predicts the reception signal strengths of the other candidate floors with the following equation, $$RSSI_P = RSSI_i - Lf * |FloorIDi - P|,$$

where $RSSI_P$ is a predicted reception signal strength of a P floor which is one of the other candidate floors, $RSSI_i$ is a reception signal strength of an AP signal corresponding to the measured i floor, Lf is an inter-floor signal loss index, FloorIDi is the floors at which the APs corresponding to the received signals are provided, and P is the candidate floors; and a location estimating unit that calculates variance values for the reception signal strengths of the candidate floors, and estimates the current location by using the variance values.

6. The apparatus of claim 5, wherein the signal receiving unit receives the signals including the IDs and the information on floors from the plurality of APs by using Wi-Fi signals.

7. The apparatus of claim 6, wherein the reception signal strength predicting unit predicts the reception signal strengths of the other candidate floors in consideration of an inter-floor signal loss value with the other candidate floors by using the measured reception signal strengths of the candidate floors.

8. The apparatus of claim 5, wherein the location estimating unit estimates that the floor having the smallest variance value is the current location of the apparatus for determining an indoor location.

* * * * *